(12) United States Patent
Shang et al.

(10) Patent No.: US 7,356,908 B2
(45) Date of Patent: Apr. 15, 2008

(54) METHOD OF ASSEMBLING A DISK DRIVE UNIT VIA A RAMP TOOL

(75) Inventors: Ping Shang, DongGuan (CN); YiuSing Ho, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 463 days.

(21) Appl. No.: 11/003,523

(22) Filed: Dec. 6, 2004

(65) Prior Publication Data

US 2006/0119979 A1    Jun. 8, 2006

(51) Int. Cl.
*G11B 5/127* (2006.01)
*H04R 31/00* (2006.01)

(52) U.S. Cl. .............................. 29/603.06; 29/603.03; 29/603.04; 360/97.01; 360/97.02; 360/97.03; 360/254.3; 360/255.2

(58) Field of Classification Search ............. 29/603.03, 29/603.04, 603.06, 737; 360/97.01–97.03, 360/254.3–254.6, 255.2–255.5
See application file for complete search history.

(56) References Cited

U.S. PATENT DOCUMENTS

| 5,237,472 | A  | * | 8/1993  | Morehouse et al. | 360/254.8 |
| 6,487,053 | B1 | * | 11/2002 | Matsumura et al. | 360/265.7 |
| 6,538,850 | B1 | * | 3/2003  | Hadian et al.    | 360/245.7 |
| 6,912,103 | B1 | * | 6/2005  | Peng et al.      | 360/75    |

* cited by examiner

*Primary Examiner*—Paul D. Kim
(74) *Attorney, Agent, or Firm*—Nixon & Vanderhye, P.C.

(57) ABSTRACT

A disk drive unit includes a first cover having a first part of magnet component and a head stack assembly mounted on the first cover; and a second cover assembled with the first cover, which having a second part of magnet component, a spindle motor and at least one disks. The invention also discloses a ramp tool used for assembling the disk drive which has its disk and HSA assembled in two different halves, which includes a tool body; and a holding means extending from the tool body to hold a lift tab of a head stack assembly in a loading status. The invention also disclose a method of assembling such as disk drive unit.

7 Claims, 6 Drawing Sheets

METHOD OF ASSEMBLING A DISK DRIVE UNIT VIA A RAMP TOOL

FIELD OF THE INVENTION

The present invention relates to disk drive units, a tool for assembling such disk drive units and an assembly method of such disk drive unit using the tool.

BACKGROUND OF THE INVENTION

Referring to FIG. 1, a traditional disk drive 20 has a bottom part and a top cover 29 which are combined with each other. The bottom part comprises a head stack assembly (HSA) 17 with a slider (not shown), a disk 11, and a ramp 15 mounted on a bottom cover 19. The disk 11 is mounted on a spindle motor 31 which causes the disk 11 to spin, and a voice-coil motor 13 is provided for controlling the motion of the HSA 17 and thus controlling the slider thereon to move from track to track across the surface of the disk 11 to read data from or write data to the disk 11. The ramp 15 transitions the slider off-of and back-onto a flying area above the surface of the rotating disk 11, which typically interacts with a lift tab at an end of the HSA 17.

However, the rework of the HSA 17 of the traditional disk drive 20, especially the slider, is not convenient because it must remove the HSA 17 from the bottom cover 19 before rework. In order to simplify the rework of the HSA 17, it attempts to mount the HSA 17 on the top cover 29. In this way, it is not required to remove the HSA 17 from the top cover 29 when reworking the HSA 17, especially the slider, but only need to separate the top cover 29 with the bottom part. But if the HSA 17 is mounted on the top cover 29, it is difficult to load the lift tab of the HSA 17 on the ramp 15 to get an initial status when assembling the top cover 29 with the bottom part because there exists a free angle between the suspension at a free status and a loading status, which results in a difference therebetween at a horizontal direction.

It is therefore desirable to provide a disk drive unit with its disk and HSA assembled in two different halves, a ramp tool for assembling such disk drive units and an assembly method of disk drive unit using the ramp tool to solve the above-mentioned problems.

SUMMARY OF THE INVENTION

A main feature of the present invention is to provide a disk drive unit which has its disk and HSA assembled in two different halves.

Another feature of the present invention is to provide a ramp tool for easily assembling a disk drive unit which has its disk and HSA assembled in two different halves.

A further feature of the present invention is to provide a method of assembling such an disk drive unit using the ramp tool.

To achieve the features of the invention, a disk drive unit comprises a first cover having a first part of magnet component and a HSA mounted on the first cover; a second cover assembled with the first cover, which having a second part of magnet component, a spindle motor and at least one disks. In the present invention, a ramp is formed on the second cover, and a ramp tool opening is formed on the first cover corresponding to the ramp for being extended through by a ramp tool. The HSA comprises a suspension with a lift tap formed at an end thereof, the lift tab is engaged with the ramp by being transferred from the ramp tool to the ramp.

A ramp tool used for assembling disk drive unit which has its disk and HSA assembled in two different halves, which comprises a tool body; and a holding means extending from the tool body for holding a lift tab of the HSA in a loading status. As an embodiment, the ramp tool further comprises a handle connected with the tool body for operating the ramp tool.

As an embodiment of the invention, the holding means vertically extends from the side of the tool body. The handle has a larger contour than that of the tool body.

An assembly method of a disk drive unit comprises the steps of: assembling a disk and a ramp on a first half of the disk drive unit; and assembling a head stack assembly on a second half of the disk drive unit with a ramp tool opening formed thereon corresponding to the ramp; forming a ramp tool and inserting it to extend through the ramp tool opening to hold a lift tab of head stack assembly in a loading status; assembling the first and second halves together to superpose the lift tab, the ramp tool and the ramp together; moving the ramp tool to transfer the lift tab of head stack assembly from the ramp tool to the ramp on the first half of the disk drive unit.

In the present invention, forming the ramp tool comprises a step of forming a holding means thereon to hold the lift tab; a step of forming a tool body which can rotate in the ramp tool opening; and a step of forming a handle to operate the ramp tool. In addition, the method further comprises a step of removing the ramp tool from the second half of the disk drive unit, and a step of sealing the ramp tool opening by adhesive tape or plugger.

Because the ramp tool of the present invention is used to hold the lift tab of the HSA in a loading status before the first and second halves of the disk drive unit are combined together, so it deletes the influence of the free angle existing between the suspension of the HSA in a free status and a loading status. In addition, because the ramp tool can be rotated in the ramp tool opening, so it can adjust the position of the lift tab loaded thereon corresponding to the ramp, and is easily removed from the position between the lift tab and the ramp when the lift tab, the ramp tool and the ramp are superposed together, and thus transfers the lift tab onto the ramp. Most importantly, because the HSA is mounted on a half of the disk drive unit which is different with the half of the disk drive unit with the disk mounted, so the HSA, especially the slider, can be rework in a disk drive level, that is, it is not required to remove the HSA from the second half of the disk drive, and only need to separate the first and second halves of the disk drive unit with each other. Finally, the ramp tool of the present invention can be easily removed from the second half of the disk drive unit after transferring the lift tap of the suspension to the ramp, so that it won't affect normal operation of the disk drive unit after assembly.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
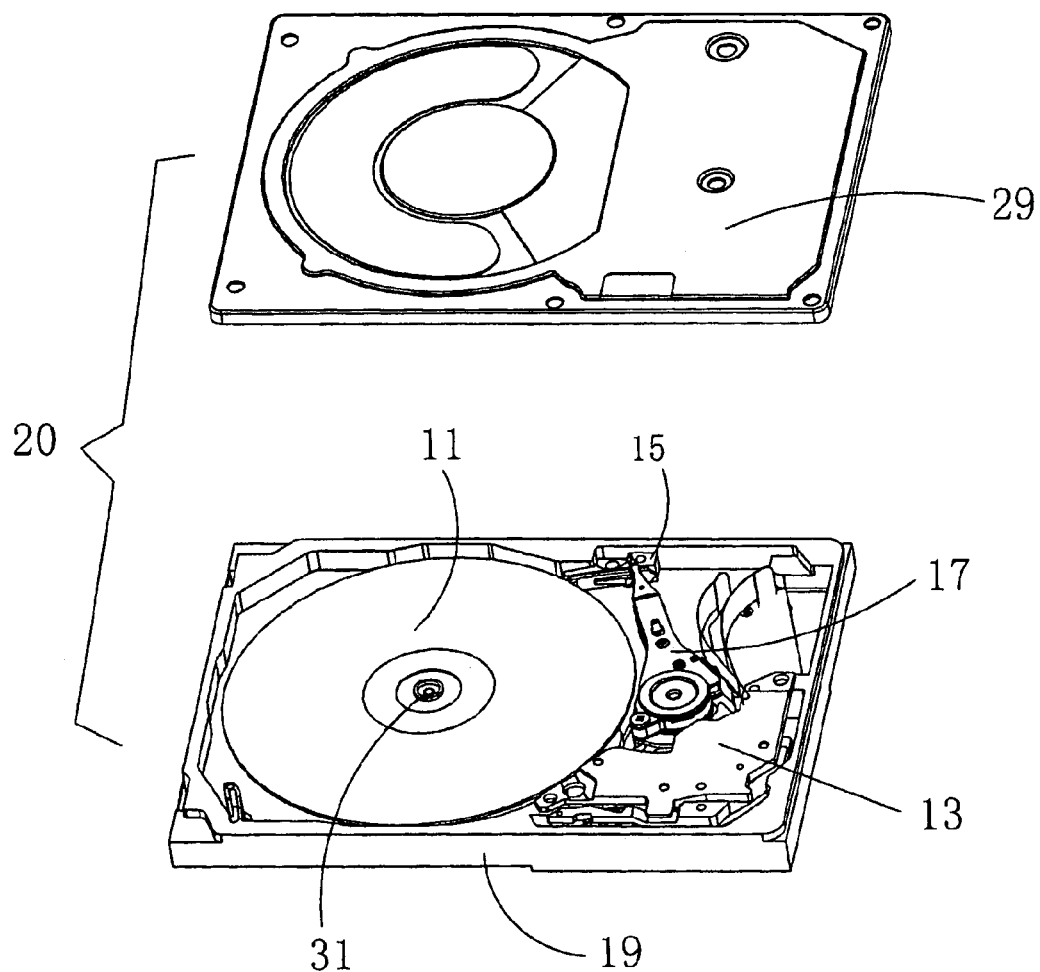
FIG. 1 is an exploded, perspective view of a traditional disk drive unit.
Figure 2:
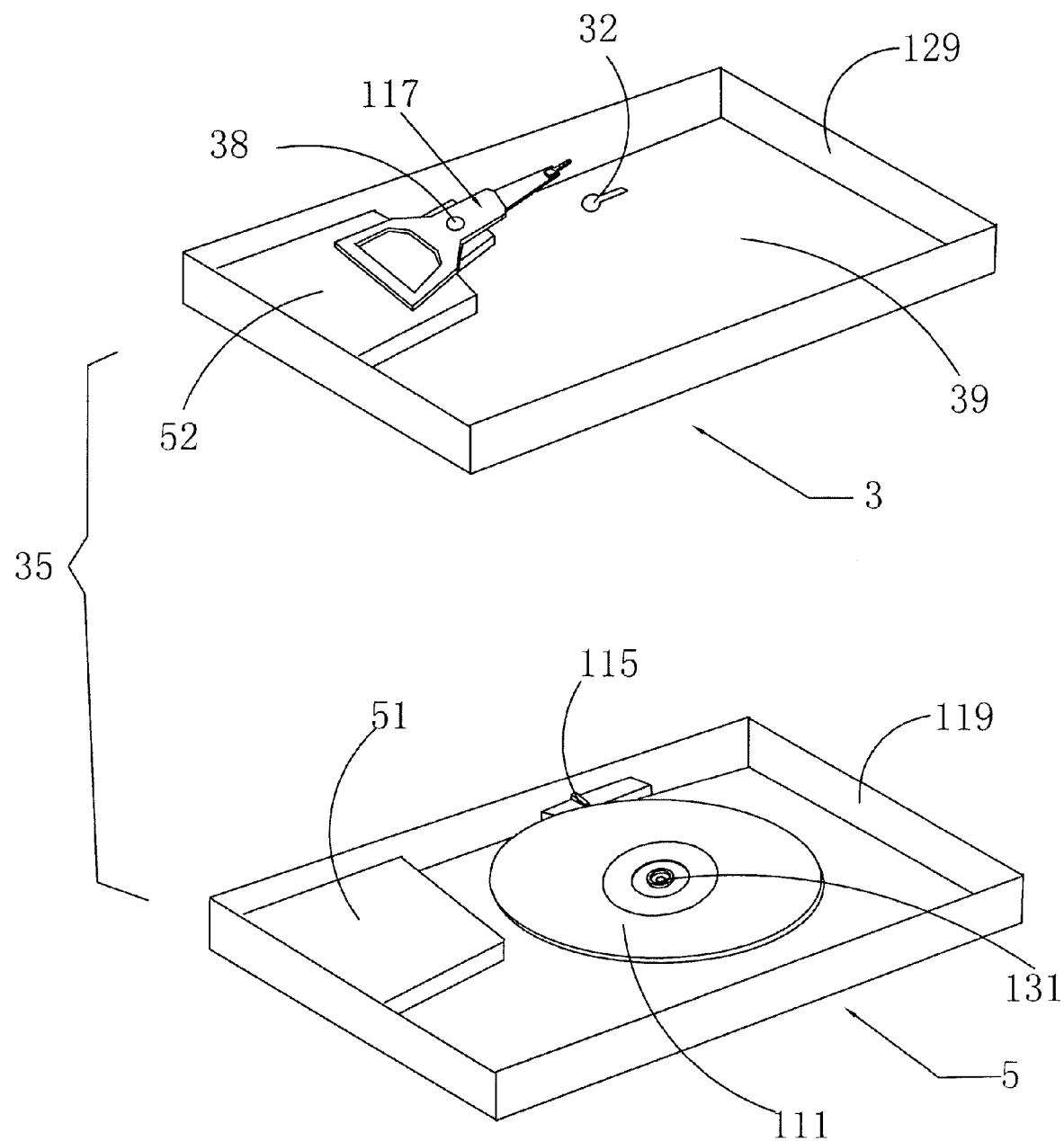
FIG. 2 is an exploded, perspective view of a disk drive unit according to an embodiment of the present invention.

Referring now to the drawings in detail, FIG. 2 shows a disk drive unit 35 according to an embodiment of the present invention. The disk drive unit 35 comprises a top part 3 and a bottom part 5. The top part 3 comprises a top cover 129, a top magnet component 52 and a HSA 117 mounted on the top cover 129. As an embodiment, the HSA 117 is mounted on the top cover 129 by a bearing 38 so that the HSA 117 can rotate about it. The bottom part 5 comprises a bottom cover 119, a bottom magnet component 51 and a spindle motor 131 mounted on the bottom cover 119. A disk 111 is mounted on and rotated by the spindle motor 131. The top cover 129 and the bottom cover 119 are combined with each other by securing means (not shown). In the invention, a ramp 115 is formed on one side of the bottom cover 119, which is adjacent to the disk 111.

Figure 3:
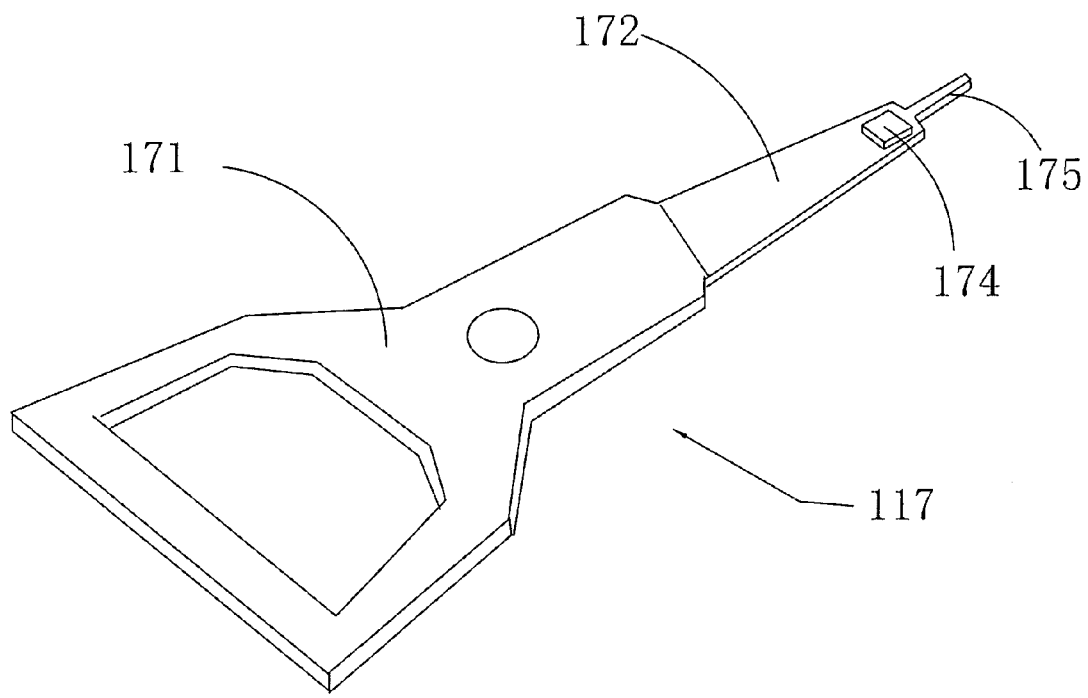
FIG. 3 is an perspective view of a HSA of the disk drive unit of FIG. 2.
Figure 5:
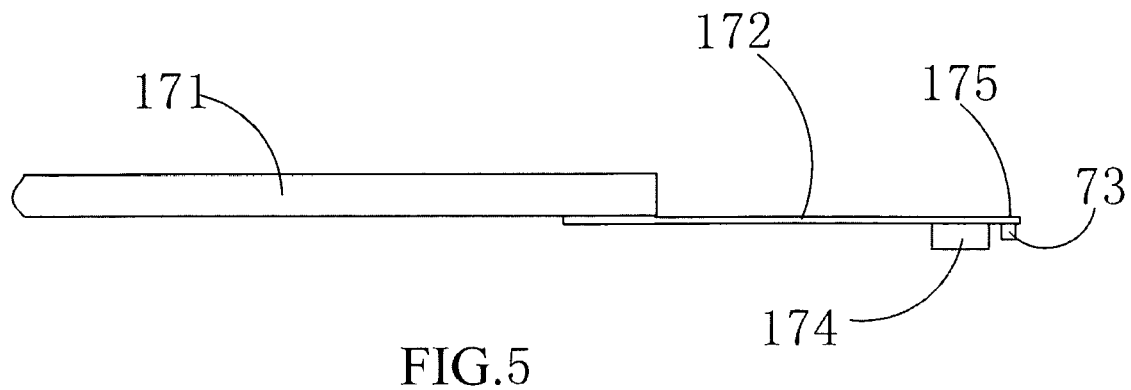
FIG. 5 is a partial, schematic view showing a suspension of the HSA of FIG. 3 held in a loading status by the ramp tool.
Figure 6:
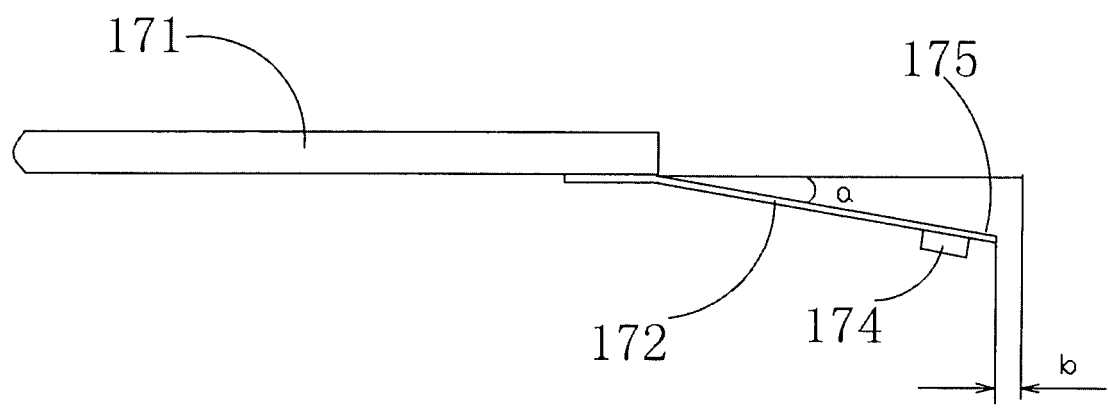
FIG. 6 is a partial, schematic view showing a suspension of the HSA of FIG. 3 in a free status.

Referring to FIG. 3, the HSA 117 comprises a drive arm 171, a suspension 172 connected with the drive arm 171, and a slider 174 mounted on the suspension 172 (the suspension 172 with the slider 174 is called "HGA"). A lift tap 175 is formed at a far distal end of the suspension 172, which is used to engage with the ramp 115. As shown in FIGS. 2 and 6, when the suspension 172 is at a free status, which is biased in a direction deviating from the top cover 129. When the suspension 172 is at a loading status, the lift tap 175 is engaged with the ramp 115, and the suspension 172 is parallel to the drive arm 171, as shown in FIG. 5 (the numeral 73 can be understood as the ramp 115). So, it is easy to see there exists a free angle between the suspension 172 at a free status and a loading status, which causes a difference b at a horizontal direction between the lift tab 175 at a free status and a loading status. So, when combining the top part 3 with the bottom part 5, it will very difficult to load the lift tab 175 on the ramp 15 to get an initial position because in this time the position of the lift tab 175 is not corresponding to the position of the ramp 115.

To load the lift tab 175 on the ramp 15 when combining the top part 3 with the bottom part 5, the invention provides a ramp tool with a special structure. Accordingly, the disk drive unit 35 can be assembled as follows: forming the top cover 129 with a ramp tool opening corresponding to the ramp 115; assembling a HSA 117 and other essential parts on the top cover 129 to form a top part 3; and assembling the disk 111, the ramp 115 and other essential parts on the bottom cover 119 to form a bottom part 5; inserting the ramp tool to extend through the ramp tool opening to hold a lift tab of HSA 117 at a loading status; assembling the top part 3 with the bottom part 5 to superpose the lift tab, the ramp tool and the ramp 115 together; and moving the ramp tool to transfer the lift tab of HSA 117 from the ramp tool to the ramp 115 on the bottom cover 119.

Figure 4:
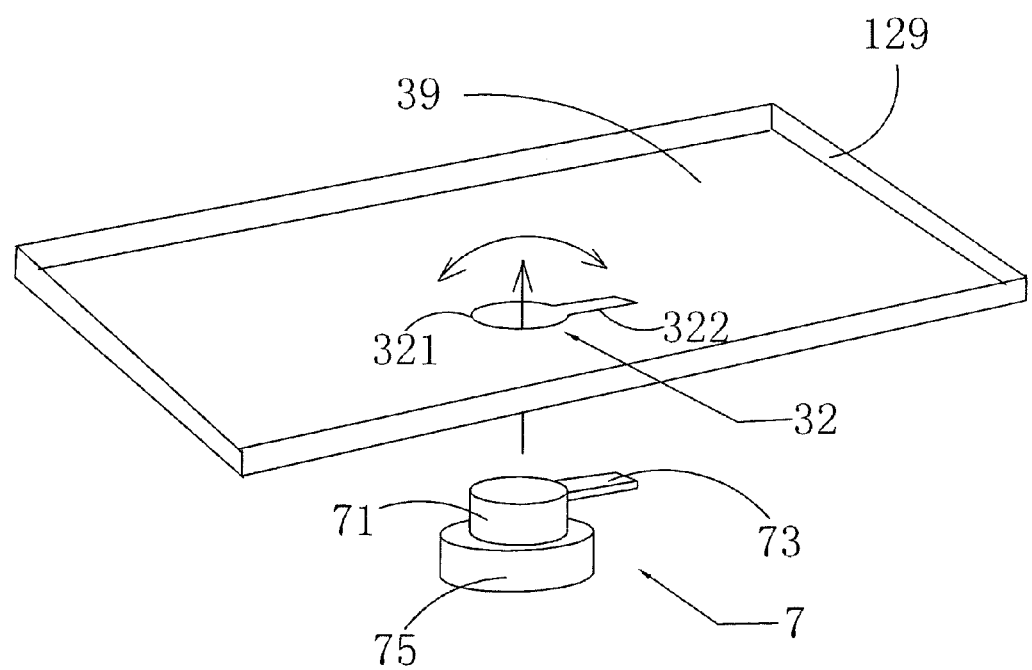
FIG. 4 is an perspective view to show a top cover of the disk drive unit of FIG. 2 and a ramp tool of the present invention, and an assembly relationship therebetweeen.

According to a first embodiment of the invention, referring to FIG. 4, the ramp tool 7 comprises a tool body 71 and a holding plate 73 extending from the side of the tool body 71. The tool body 71 is cylinder-shaped and the holding plate is bar-shaped which is perpendicular to the axis of the tool body 71. In addition, the ramp tool 7 may further comprise a handle 75 connected with the tool body 71, which is used for operating the ramp tool 7. In an embodiment, the handle 75 is also cylinder-shaped, which has a larger diameter than that of the tool body 71. In the present invention, see FIGS. 2 and 4, a ramp tool opening 32 is formed on a top plate 39 of the top cover 3 corresponding to the ramp 115 for being extended through by the ramp tool 7. The ramp tool opening 32 is constituted by an arc opening 321 with an obtuse angle and a bar opening 322. In the embodiment, the contour of the bar opening 322 is equal to or larger than that of the holding plate. The diameter of the arc opening 321 is equal to or larger than that of the tool body 71, but less than that of the handle 75. The tool body 71 has a length larger than the thickness of the top plate 39 of the top cover 129, and the distance between the holding plate 73 and the handle 75 are also larger than the thickness of the top plate 39 of the top cover 129, so that the holding plate 73 can extend through the ramp tool opening 32 and hold the lift tab 175 of the HSA 117.

Figure 7:
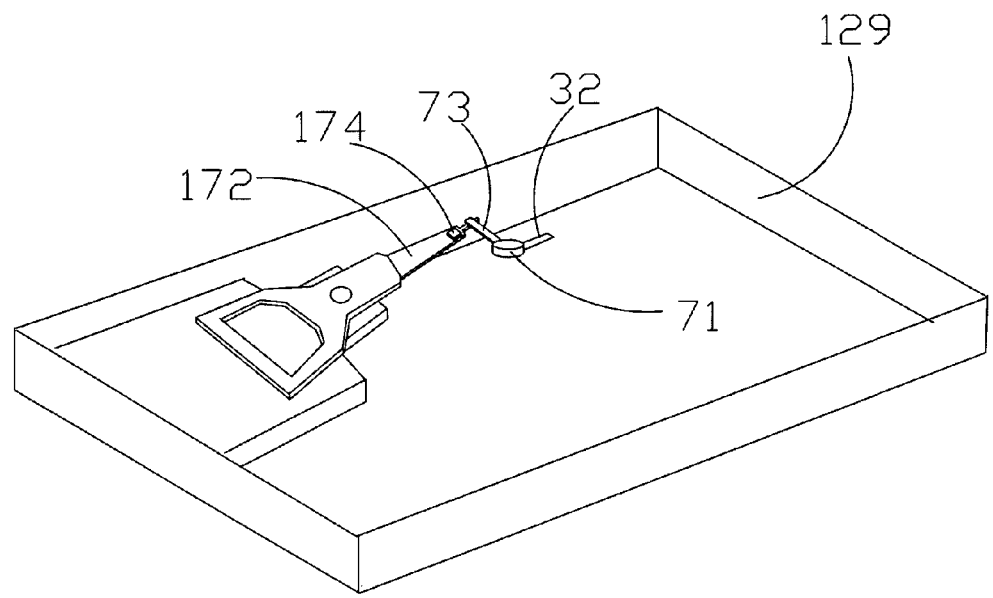
FIG. 7 is a perspective view showing a suspension of the HSA of FIG. 3 held in a loading status by the ramp tool.

In the present invention, referring to FIG. 4, the hard disk drive 35 are assembled as follows: firstly, the ramp tool 7 is inserted into the ramp tool opening 32, because the diameter of the arc opening 321 is less than that of the handle 75, so the handle 75 is left outside of the top cover 129. Thus, the ramp tool 7 can be rotated by the handle 75 with the axis of the tool body 71 as rotation axis even when the top part 3 and the bottom part 5 are combined together due to the shape of the arc opening 321 and the tool body 71. Then, referring to FIG. 7, the ramp tool 7 is rotated and the holding plate 73 thereof hooks in and exerts a force to the lift tap 175 so as to hold the lift tab 175 at a loading status, as shown in FIG. 5. At the time, the lift tap 175 exerts a counterforce to the holding plate 73 so as to hold the ramp tool 7 on the top cover 129.

Figure 8:
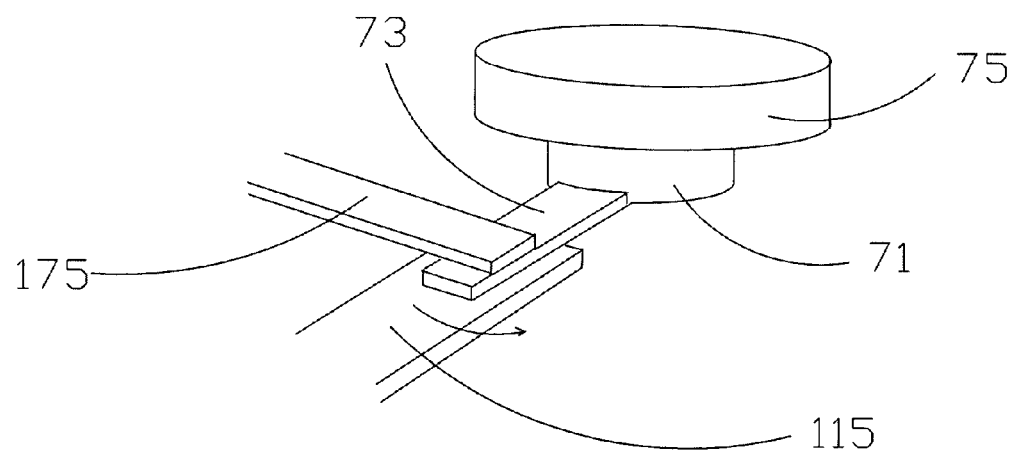
FIG. 8 is an enlarged, perspective view depicting a lift tap of the suspension being transferred from the ramp tool to the ramp.
Figure 9:
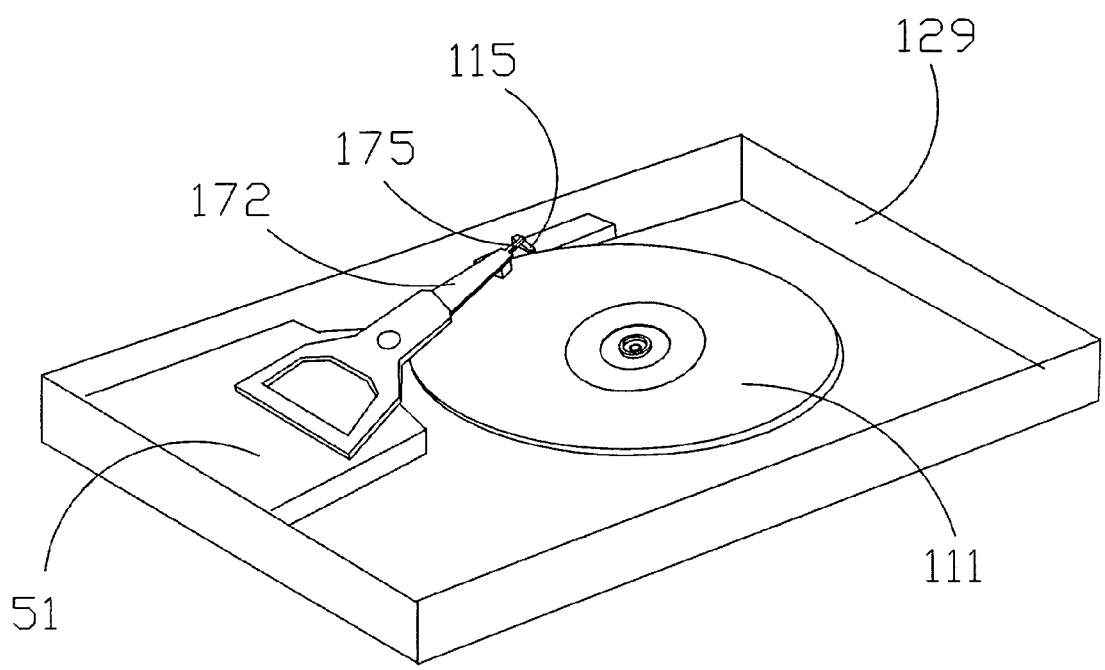
FIG. 9 is a perspective view to show a status that the lift tap of the suspension being transferred to the ramp, which omitting the top cover and a top magnet component herefrom.
Figure 10:
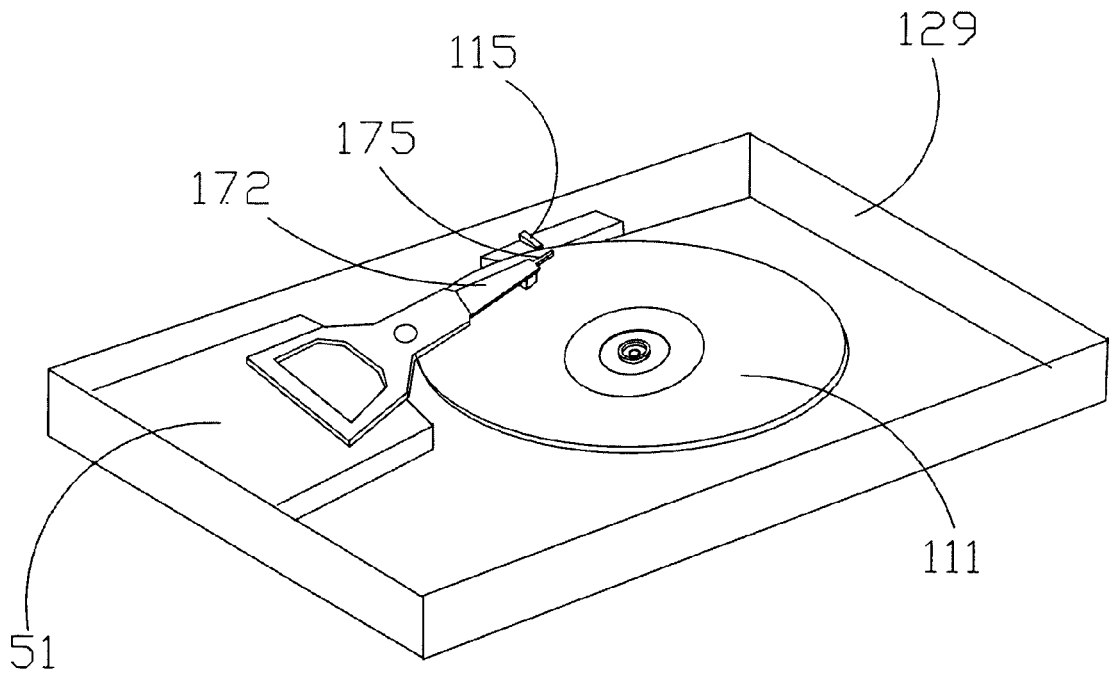
FIG. 10 is a perspective view to show a working status of the disk drive unit of FIG. 2, which omitting the top cover and a top magnet component herefrom.

After that, the top part 3 is combined with the bottom part 5 so that the top magnet component 52 and the bottom magnet component 51 are faced with each other and constitute a servo control system (such as a VCM) to move the HSA 117 around the bearing 38. Because the ramp tool opening 32 is designed corresponding to the ramp 115, and the lift tap 175 is held at a loading status, thus the holding plate 73, the lift tab 175 and the ramp 115 are superposed together, and the holding plate 73 is interposed between the lift tab 175 and the ramp 115, as shown in FIG. 8. When the top part 3 and the bottom part 5 are combined, the lift tab 175 is easily transferred from the holding plate 73 to the ramp 115 by rotating the ramp tool 7, and engaged with the ramp 115, as shown in FIG. 9. When at a working status, the lift tab 175 of the suspension 172 is moved down the ramp 115 by the server control system such that an air bearing is developed between the slider 174 and the disk 111. Then, the slider 174 moves free of the ramp 115 and flies above on the disk 2 to read data from or write data to the magnetic disk 2, as shown in FIG. 10. When the work is stopped, the lift tab 175 is moved onto the ramp 15 such that the slider 174 is moved away from the disk 111.

After the lift tab 175 engages with the ramp 115, the ramp tool 7 can be removed from the top cover 129 through the ramp tool opening 32 by rotating the ramp tool 7 to a predetermined position. To keep a good appearance of the disk drive unit 35 and prevent other objects from entering the chamber formed by the top part 3 and the bottom part 5, the ramp tool opening 32 can be sealed by adhesive tape or plugger.

In the present invention, the ramp tool 7 can be made of a single material, such as metal or plastic, or several materials, for example, the different portions of the ramp tool 7 are made of different materials. The materials have enough rigidity so as to reliably hold the lift tab 175 at a loading status, such as stainless steel. As an embodiment, the ramp tool 7 can be integrally formed or formed by assembled the different portions thereof. In addition, the holding plate 73 has a small thickness and accordingly the distance between the lift tab 175 and the ramp 115 is short when the lift tab 175, the holding plate 73 and the ramp 115 are superposed together. Thus, the lift tab 175 can be transferred onto the ramp 115 more smoothly and more precisely.

In the present invention, the handle 75 is not limited to the cylinder-shaped structure, any structure having a contour larger than that of the arc opening 321 can be used. Similarly, the holding plate 73 and the tool body 71 is also not limited to the above-mentioned structure, any structures performing a same function can be used.

In the present invention, the ramp tool is used to hold the lift tab of the suspension in a loading status before the top part and the bottom part are combined together, so it deletes the influence of the free angle existing between the suspension in a free status and a loading status. In addition, because the ramp tool can be rotated, so it can adjust the position of the lift tab corresponding to the ramp, and is easily removed from the position between the lift tab and the ramp when the lift tab, the ramp tool and the ramp are superposed together, and thus transfers the lift tab onto the ramp. Most importantly, because the HSA is mounted on the top cover, the HSA, especially the slider, can be rework in a disk drive level, that is, it is not required to remove the HSA from the top cover, and only need to separate the top part with the bottom part. Finally, the ramp tool of the present invention can be easily removed from the top cover after transferring the lift tap of the suspension to the ramp, so that it won't affect normal operation of the disk drive unit after assembly.

What is claimed is:

1. An assembly method of a disk drive unit, said method comprising:
   assembling a disk and a ramp on a first half of the disk drive, and assembling a head stack assembly on a second half of the disk drive with a ramp tool opening formed thereon corresponding to the ramp;
   forming a ramp tool and inserting the ramp tool to extend through the ramp tool opening to hold a lift tab of head stack assembly in a loading status;
   assembling the first and second halves together to superpose the lift tab, the ramp tool and the ramp together; and
   moving the ramp tool to transfer the lift tab of head stack assembly from the ramp tool to the ramp on the first half of the disk drive.

2. The assembly method of a disk drive unit according to claim 1, wherein forming the ramp tool comprises a step of forming a holding means thereon to hold the lift tab.

3. The assembly method of a disk drive unit according to claim 2, wherein forming the ramp tool further comprises a step of forming a tool body which can rotate in the ramp tool opening.

4. The assembly method of a disk drive unit according to claim 3, wherein forming the ramp tool further comprises a step of forming a handle to operate the ramp tool.

5. The assembly method of a disk drive unit according to claim 1, further comprising a step of removing the ramp tool from the second half of the disk drive unit.

6. The assembly method of a disk drive unit according to claim 5, further comprising a step of sealing the ramp tool opening.

7. The assembly method of a disk drive according to claim 6, wherein the ramp tool opening is sealed by adhesive tape or plugger.

* * * * *